US006984040B2

(12) United States Patent
Childers (10) Patent No.: US 6,984,040 B2
(45) Date of Patent: Jan. 10, 2006

(54) SYNCHRONIZING PERIODIC VARIATION OF A PLURALITY OF COLORS OF LIGHT AND PROJECTION OF A PLURALITY OF SUB-FRAME IMAGES

(75) Inventor: Winthrop D. Childers, San Diego, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 8 days.

(21) Appl. No.: 10/761,398

(22) Filed: Jan. 20, 2004

(65) Prior Publication Data

US 2005/0157272 A1 Jul. 21, 2005

(51) Int. Cl.
G03B 21/26 (2006.01)
G03B 21/14 (2006.01)
H04N 9/12 (2006.01)

(52) U.S. Cl. ............................ 353/30; 353/84; 348/743
(58) Field of Classification Search ................. 353/30, 353/84, 94, 31; 348/742–743, 771, 745, 348/806

See application file for complete search history.

(56) References Cited

U.S. PATENT DOCUMENTS

| 5,448,314 | A | * | 9/1995 | Heimbuch et al. | ........... 348/743 |
| 5,475,428 | A | * | 12/1995 | Hintz et al. | ................. 348/263 |
| 6,084,235 | A | * | 7/2000 | Breithaupt et al. | ......... 348/743 |
| 6,657,603 | B1 | | 12/2003 | Demetrescu et al. | |
| 6,817,718 | B2 | * | 11/2004 | Katoh | ........................ 353/84 |
| 2002/0140910 | A1 | * | 10/2002 | Stark et al. | ................... 353/84 |
| 2003/0090597 | A1 | * | 5/2003 | Katoh et al. | ................. 348/744 |
| 2003/0132901 | A1 | | 7/2003 | Shimada | |
| 2004/0207815 | A1 | * | 10/2004 | Allen et al. | ................... 353/31 |
| 2004/0239885 | A1 | * | 12/2004 | Jaynes et al. | ................. 353/30 |
| 2005/0024593 | A1 | * | 2/2005 | Pate et al. | ..................... 353/31 |
| 2005/0078056 | A1 | * | 4/2005 | Childres | ...................... 345/32 |
| 2005/0157273 | A1 | * | 7/2005 | Collins et al. | ................ 353/84 |

FOREIGN PATENT DOCUMENTS

EP 1 524 862 A2 4/2005
WO WO 2004/105376 A2 12/2004

OTHER PUBLICATIONS

T. Tokita et al, "P-108: FLC Resolution-Enhancing Device for Projection Displays", SID 02 Digest, pp 638-641.

* cited by examiner

Primary Examiner—Christopher Mahoney (57) ABSTRACT

A plurality of colors of light is generated. The plurality of colors of light have a color sequence that periodically varies with a characteristic sequential color time period. The plurality of colors of light are modulated to provide a plurality of sub-frame images for each of a sequence of image frames. The plurality of sub-frame images are projected for each of the image frames during a frame period. For each image frame, each of the sub-frame images is projected displaced relative to each other sub-frame image. The periodic variation of the plurality of colors of light and the projection of the plurality of sub-frame images are synchronized to assure an integer relationship between the color time period and the frame period.

31 Claims, 11 Drawing Sheets

SYNCHRONIZING PERIODIC VARIATION OF A PLURALITY OF COLORS OF LIGHT AND PROJECTION OF A PLURALITY OF SUB-FRAME IMAGES

FIELD OF THE INVENTION

This invention relates in general to creating a sequence of image frames and, more particularly, to synchronizing periodic variation of a plurality of colors of light and projection of a plurality of sub-frame images during the creation of a sequence of image frames.

BACKGROUND OF THE INVENTION

Many display systems produce color image frames by generating a plurality of colors of light in sequence, spatially modulating the colors of light and projecting the spatially modulated colors of light to form the image frames. The colors of light are typically derived from a white light source passed through a color filter wheel, prism, or some other color filter.

In order to enhance the resolution quality of a projected image frame, the image frame may be temporally divided into a number of sub-frame images. The sub-frame images are projected spatially displaced relative to the other sub-frame images of the image frame.

SUMMARY OF THE INVENTION

According to principles of the present invention, in one embodiment, a plurality of colors of light are generated. The plurality of colors of light have a color sequence that periodically varies with a characteristic sequential color time period. The plurality of colors of light are modulated to provide a plurality of sub-frame images for each of a sequence of image frames. The plurality of sub-frame images are projected for each of the image frames during a frame period. For each image frame, each of the sub-frame images is projected displaced relative to each other sub-frame image. The periodic variation of the plurality of colors of light and the projection of the plurality of sub-frame images are synchronized to assure an integer relationship between the color time period and the frame period.

DETAILED DESCRIPTION OF THE INVENTION

Figure 1:
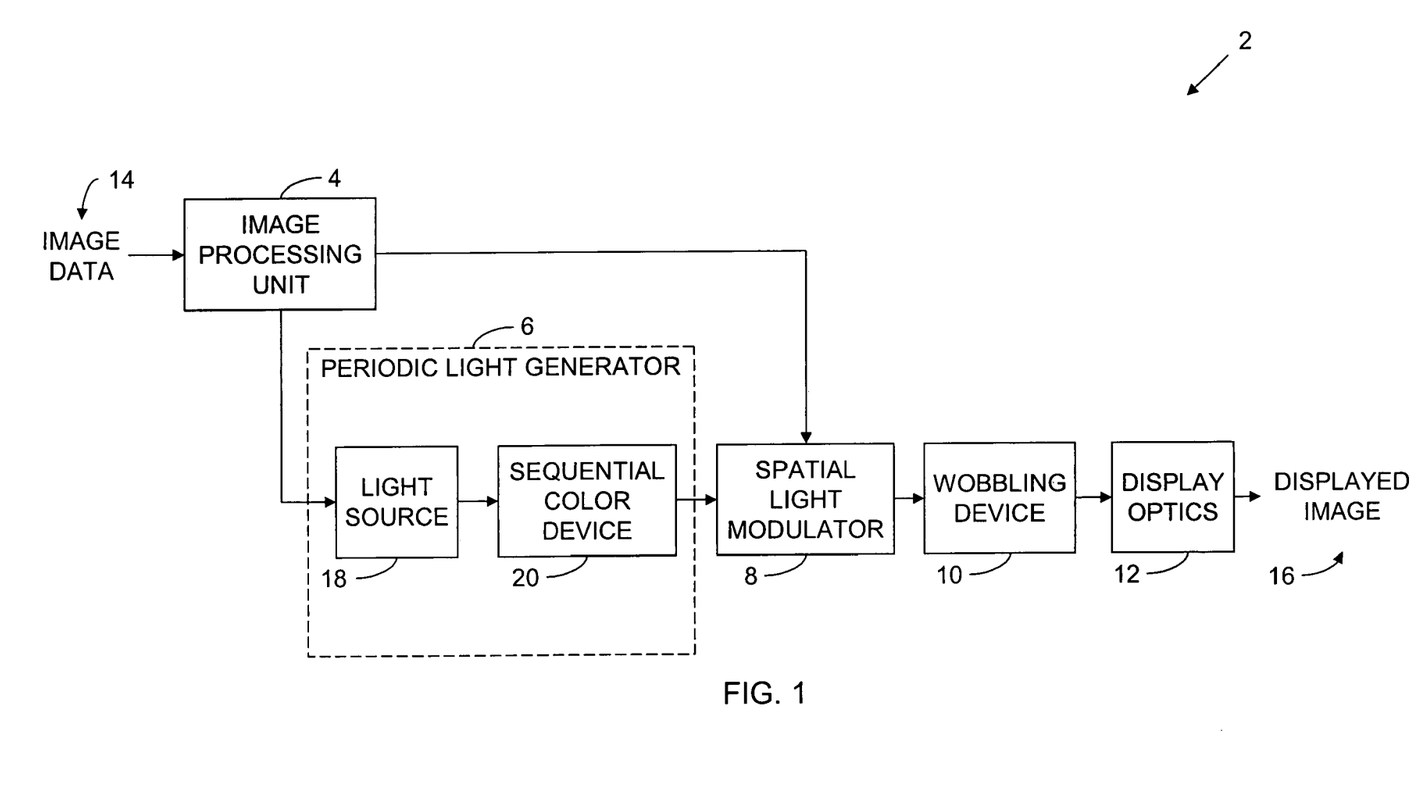
FIG. 1 is a block diagram illustrating one embodiment of the present invention display system.

Illustrated in FIG. 1 is one embodiment of a display system 2 of the present invention. The term "display system" is used herein and in the appended claims, unless otherwise specifically denoted, to refer to a projector, projection system, image display system, television system, video monitor, computer monitor system, or any other system configured to create a sequence of image frames. The sequence of image frames produces an image that may be a still image, a series of images, or motion picture video. The phrase "sequence of image frames" and the term "image" are used herein and in the appended claims, unless otherwise specifically denoted, to refer broadly to a still image, series of images, motion picture video, or anything else that is displayed by a display system.

In the embodiment illustrated in FIG. 1, display system 2 includes image processing unit 4, periodic light generator 6, spatial light modulator (SLM) 8, wobbling device 10, and display optics 12. Display system 2 receives image data 14. Image data 14 defines image 16 to be displayed and display system 2 uses image data 14 to produce displayed image 16. Examples of image data 14 include digital image data, analog image data, and a combination of analog and digital data. While one image 16 is illustrated and described as being processed by display system 2, it will be understood by one skilled in the art that a plurality or series of images 16, or motion picture video display 16, may be processed by display system 2.

Periodic light generator 6 is any apparatus or system configured to generate a plurality of colors of light having a color sequence that periodically varies with a characteristic sequential color time period. Periodic light generator 6 is disposed within display device 2 to pass the plurality of colors of light across SLM 8. In one embodiment, periodic light generator 6 includes light source 18 and sequential color device 20.

In one embodiment periodic light generator 6 generates a light beam carrying a sequence of primary colors and optionally white light. Stated another way, periodic light generator 6 outputs a beam having a spectral distribution that changes with time in a periodic manner. For example, periodic light generator 6 may generate a beam that varies between primary colors red, green, and blue as well as white. Alternatively, periodic light generator 6 may additionally output colors such as cyan, yellow, and magenta or any other color. Reference to a light beam of a particular color indicates that the spectral distribution of the light beam has a peak wavelength that can be characterized as visible light of that color. Color filter elements are a common way to alter a white light source to provide such a spectral peak.

Light source 18 is any source of light suitable for use in a projector. One example of such a suitable light source 18 is an ultra high pressure mercury lamp. As shown in FIG. 1, light source 18 provides a beam of light to sequential color device 20.

Sequential color device 20 is any apparatus or system configured to sequentially modulate light from light source 18 into a plurality of colors or wavelengths. In one embodiment, a color time period set point may be set to control the color time period of sequential color device 20. Examples of sequential color devices 20 include a color filter wheel 22 (FIGS. 2–5) and a set of rotating prisms.

FIGS. 2–5 illustrate several examples of color filter wheels 22. Each color filter wheel 22 includes a plurality of color filters 24. Each color of color filter wheel 22 is a color filter element 24. Although illustrated as having equally sized color filter elements 24 for each color, it is not uncommon for color filter elements 24 to be differently sized. Often the relative sizing of color filter elements 24 is used to accommodate an unbalanced light source 18. For example if light source 18 is red deficient, the red color filter element 24 may be relatively larger than the other color filter elements 24.

Color filter wheels 22 operate by rotating to sequentially allow only selected colors or wavelengths of light to pass through each color filter element 24. Rotating color filter wheels 22 have a time period of rotation that is an integer multiple of the characteristic sequential color time period of periodic light generator 6. For example, the time period of rotation of the color filter wheels 22 illustrated in FIGS. 2 and 4 equals the characteristic sequential color time period of periodic light generator 6, since each of the color filter wheels 22 has a single set of color filter elements 24. Similarly, the time period of rotation of the color filter wheels 22 illustrated in FIGS. 3 and 5 equals twice the characteristic sequential color time period of periodic light generator 6, since each color filter wheel 22 has two sets of colors filter elements 24 on each color filter wheel 22.

Figure 6:
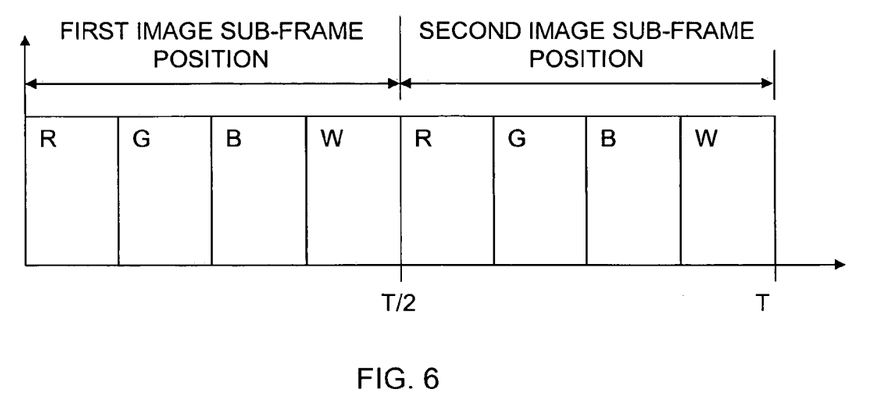
FIG. 6 illustrates an exemplary timing diagram for the color filter wheels shown in FIGS. 3 and 4.
Figure 7:
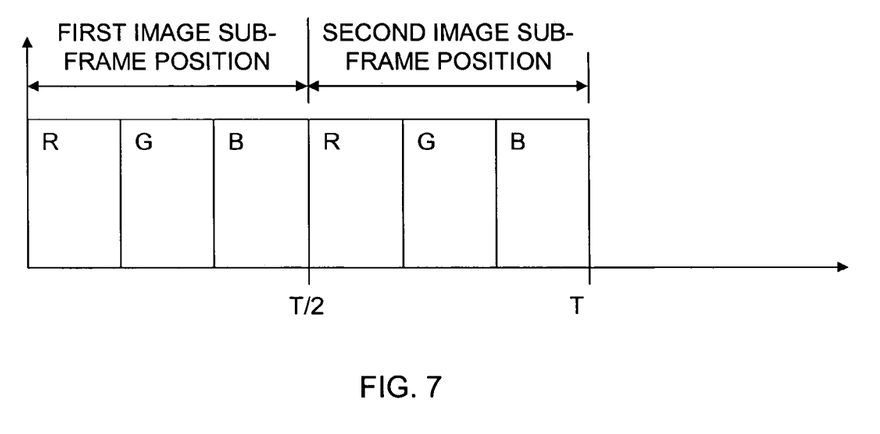
FIG. 7 illustrates an exemplary timing diagram for the color filter wheels shown in FIGS. 5 and 6.

FIGS. 6 and 7 illustrate the relationship between frame period T and the rotation of a color filter wheel 22. In these figures, R, G, B, and W refer to red, green, blue, and white color sub-frames.

The time during which each frame is being output is frame period T. A spatial or image sub-frame period is a portion of frame period T during which each spatial or image sub-frame is being output. A color sub-frame is a portion of frame period T during which the periodic light generator is outputting a particular color or primary color. Frame period T is any suitable frame period T. A typical frame period T is $1/60^{th}$ of a second. As depicted by FIGS. 6 and 7 a complete set of color sub-frames are generated at least once for each spatial or image sub-frame. Stated another way, periodic light generator 6 generates a complete set of primary colors at least once during a single spatial or image sub-frame.

Figure 2:
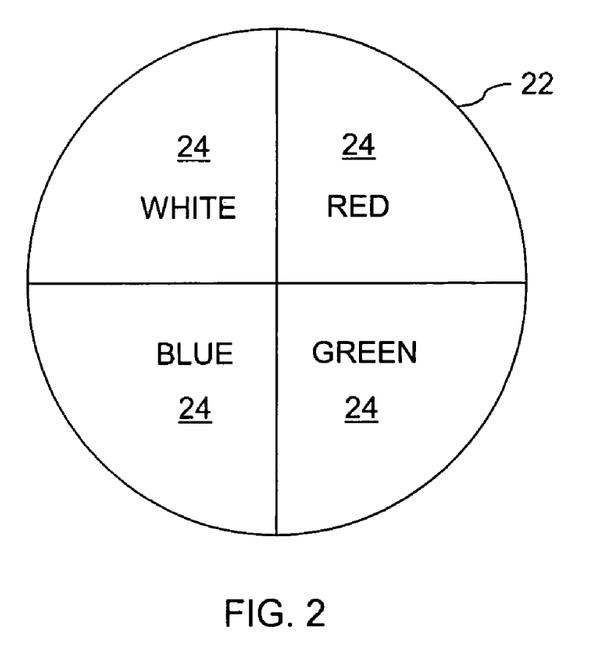
FIGS. 2–5 are examples of color filter wheels used with the display system of FIG. 1.
Figure 3:
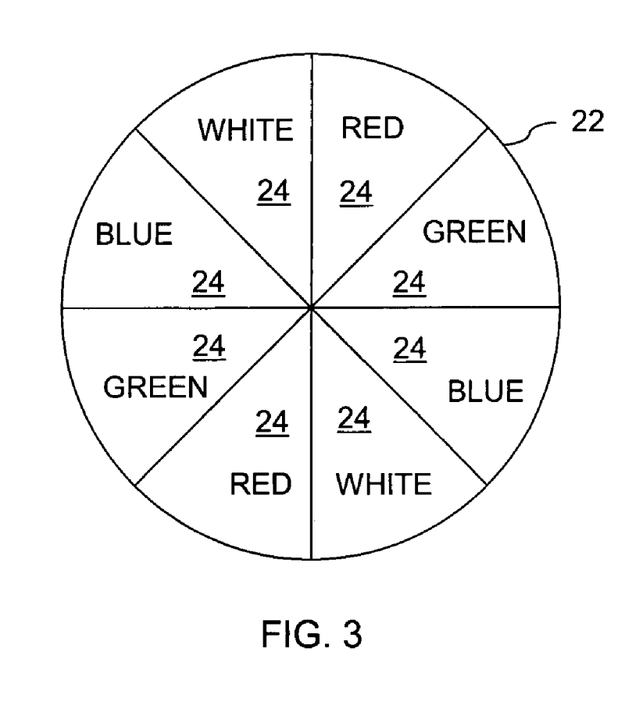

FIG. 6 shows one example of the relationship between frame period T and the rotation of the color filter wheels 22 depicted in FIGS. 2 and 3. In this example, the color filter wheel 22 of FIG. 2 spins with a period equal to one half of frame period T. For example, with frame period T of $1/60^{th}$ of a second, color filter wheel 22 spins at 7200 RPM, two complete revolutions during frame period T.

The color filter wheel 22 of FIG. 3 spins with a period equal to frame period T but since the color filter wheel 22 of FIG. 3 is an RGBWRGBW wheel, the effect is the same as the color filter wheel 22 of FIG. 2 spinning twice as fast. At the same frame period T of $1/60^{th}$ of a second, the color filter wheel 22 of FIG. 3 rotates at 3600 RPM.

Figure 4:
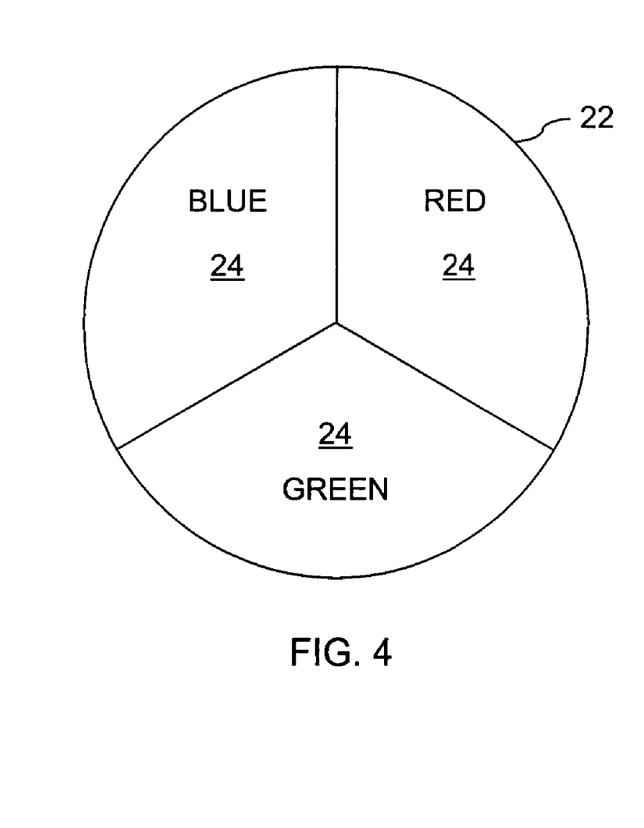
Figure 5:
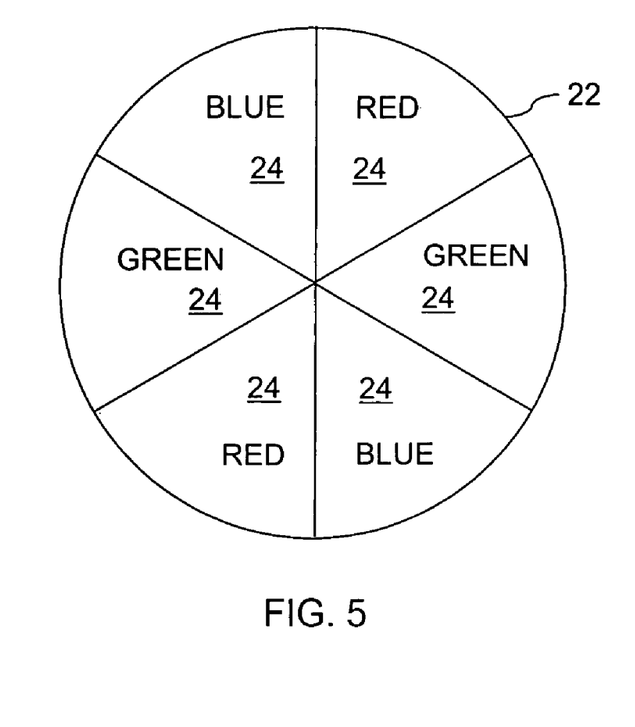

FIG. 7 shows one example of the relationship between frame period T and the rotation of the color filter wheels 22 depicted in FIGS. 4 and 5. In this example, the color filter wheel 22 of FIG. 4 spins with a period equal to one half of frame period T. For example, with frame period T of $1/60^{th}$ of a second, color filter wheel 22 spins at 7200 RPM, two complete revolutions during frame period T.

The color filter wheel 22 of FIG. 5 spins with a period equal to frame period T but since the color filter wheel 22 of FIG. 5 is an RGBRGB wheel, the effect is the same as the color filter wheel 22 of FIG. 4 spinning twice as fast. At the same frame period T of $1/60^{th}$ of a second, the color filter wheel 22 of FIG. 5 rotates at 3600 RPM.

Referring again to FIG. 1, SLM 8 is any apparatus or system configured to modulate light to provide a plurality of sub-frame images for each of the image frames during frame period T. SLM modulates incident light in a spatial pattern corresponding to an electrical or optical input. The incident light may be modulated in its phase, intensity, polarization, or direction by SLM 8.

SLM 8 is disposed to spatially modulate light from periodic light generator 6. Light transmitted by periodic light generator 6 is passed onto SLM 8. In one embodiment, the light is focused onto SLM 8 through a lens or through some other device. SLM 8 modulates the light output by periodic light generator 6 based on input from image processing unit 4 to form an image bearing beam of light.

Examples of an SLM 8 are a liquid crystal on silicon (LCOS) array and a micro-mirror array. LCOS and micro-mirror arrays are known in the art and will not be explained in detail in the present specification. One example of an LCOS array is the Philips™ LCOS modulator. One example of a micro-mirror array is the Digital Light Processing (DLP) chip available from Texas Instruments™ Inc.

In one embodiment, the modulated light from SLM 8 is eventually displayed by display optics 12 on a viewing surface (not shown). Display optics 12 are any device or system configured to display or project an image. Display optics 12 provide focusing and other optical adjustments, where necessary, for the display of display image 16 by display system 2. One example of display optics 12 includes a lens configured to project and focus displayed image 16 onto a viewing surface. Examples of the viewing surface include a screen, television, wall, or computer monitor. Alternatively, display optics 12 may include a viewing surface onto which displayed image 16 is projected.

Periodic wobbling device 10 is any apparatus or system configured to provide a relative displacement of the sub-frame images for each image frame. In one embodiment, before display optics 12 display displayed image 16, the modulated light is passed through wobbling device 10. One example of a wobbling device 10 is a galvanometer mirror. In alternate embodiments, wobbling device 10 is integrated into SLM 8 or some other component of display system 2.

Figure 8:
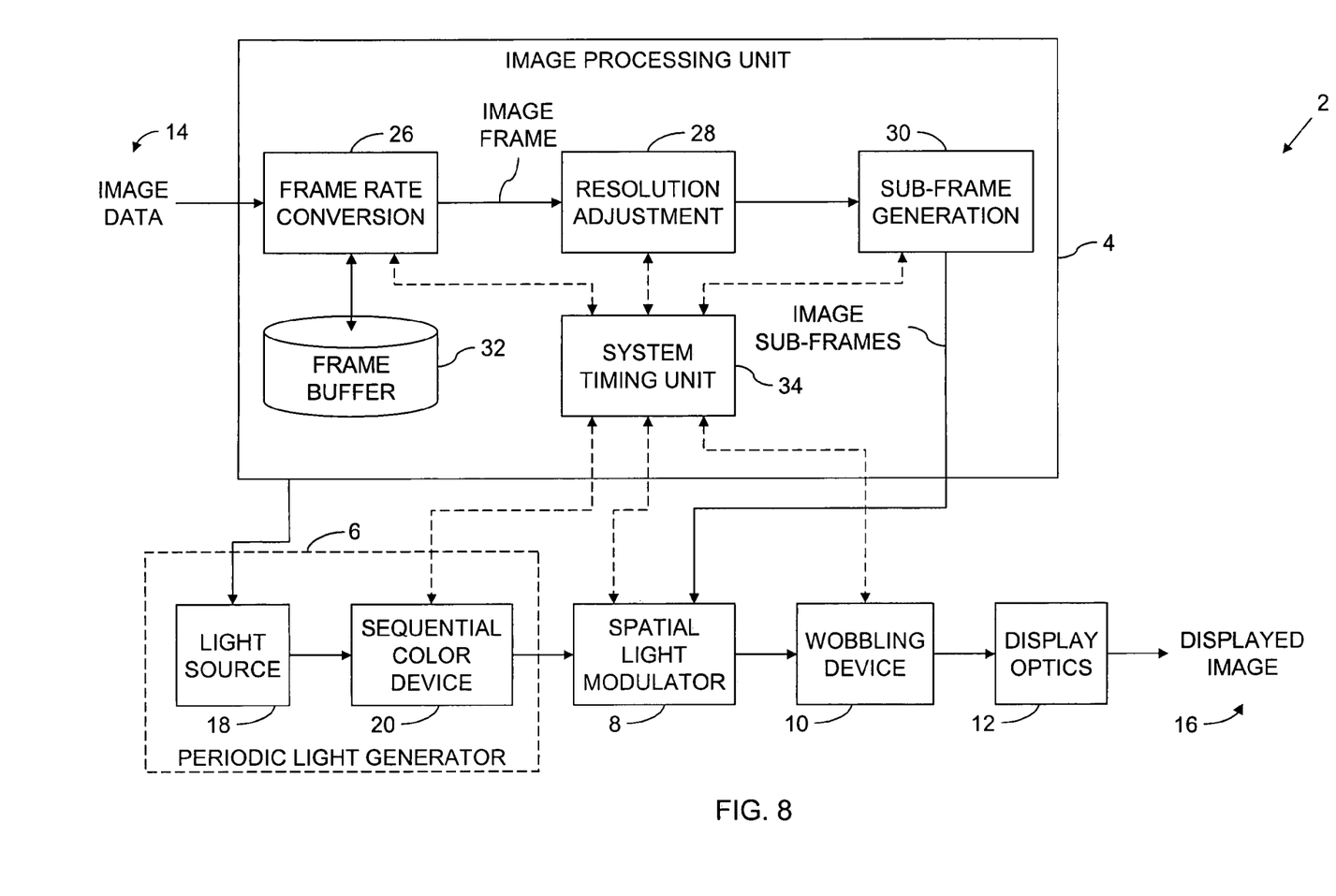
FIG. 8 is a block diagram illustrating the display system of FIG. 1, showing one embodiment of the image processing unit in more detail.

Image processing unit 4 performs various functions including controlling the illumination of light source 18 and controlling SLM 8. Image processing unit 4 may be configured to receive and process digital image data, analog image data, or a combination of analog and digital data. In one embodiment, as illustrated in FIG. 8, image processing unit 4 includes frame rate conversion unit 26, resolution adjustment unit 28, sub-frame generation unit 30, frame buffer 32, and system timing unit 34.

Frame rate conversion unit 26 and image frame buffer 32 receive and buffer image data 14 to create an image frame corresponding to image data 14. Resolution adjustment unit 28 adjusts the resolution of the frame to match the resolution capability of display system 2. Sub-frame generation unit 30 processes the image frame data to define two or more image sub-frames corresponding to the image frame. The sub-frames are displayed by display system 2 to produce displayed image 16. System timing unit 34 synchronizes the timing of the various components of display system 2.

Image processing unit 4, including frame rate conversion unit 26, resolution adjustment unit 28, sub-frame generation unit 30, and system timing unit 34, includes hardware, executable code, or a combination of these. In one embodiment, one or more components of image processing unit 4 are included in a computer, computer server, or other microprocessor-based system capable of performing a sequence of logic operations. In addition, the image processing may be distributed throughout display system 2 with individual portions of image processing unit 4 being implemented in separate system components.

System timing unit 34 is used to assure synchronicity of color filter wheel 22, wobbling device 10, and frame generation. System timing unit 34 is configured to synchronize periodic light generator 6 and periodic wobbling device 10 to assure an integer relationship between the color time period and frame period T. In one embodiment, the color time period equals frame period T. In an alternate embodiment, the color time period equals the inverse of an integer multiple of frame period T. In another embodiment, the color time period equals an integer multiple of frame period T.

Frame rate conversion unit 26 receives image data 14 corresponding to an image that is to be displayed by display system 2 and buffers or stores image data 14 in image frame buffer 32. More specifically, frame rate conversion unit 26 receives image data 14 representing individual lines or fields of the image and buffers image data 14 in image frame buffer 32 to create an image frame that corresponds to the image that is to be displayed by display system 2. Image frame buffer 32 may buffer image data 14 by receiving and storing all of image data 14 corresponding to the image frame. Frame rate conversion unit 26 may generate the image frame by subsequently retrieving or extracting all of image data 14 for the image frame from image frame buffer 32. As such, the image frame is defined to comprise a plurality of individual lines or fields of image data 14 representing an entirety of the image that is to be displayed by display system 2. Thus, the image frame includes a plurality of columns and a plurality of rows of individual pixels representing the image 16 that is to be displayed by display system 2.

Frame rate conversion unit 26 and image frame buffer 32 can receive and process image data 14 as progressive image data, interlaced image data, or both progressive image data and interlaced image data. With progressive image data, frame rate conversion unit 26 and image frame buffer 32 receive and store sequential fields of image data 14 for the image. Frame rate conversion unit 26 creates the image frame by retrieving the sequential fields of image data 14 for the image. With interlaced image data, frame rate conversion unit 26 and image frame buffer 32 receive and store the odd fields and the even fields of image data 14 for the image. For example, all of the odd fields of image data 14 are received and stored and all of the even fields of image data 14 are received and stored. As such, frame rate conversion unit 26 de-interlaces image data 14 and creates the image frame by retrieving the odd and even fields of image data 14 for the image.

Image frame buffer 32 includes memory for storing image data 14 for one or more image frames of respective images. For example, image frame buffer 32 may comprise non-volatile memory such as a hard disk drive or other persistent storage device or include volatile memory such as random access memory (RAM).

By receiving image data 14 at frame rate conversion unit 26 and buffering image data 14 in image frame buffer 32, the input timing of image data 14 can be decoupled from timing requirements of the remaining components in display system 2 (e.g.; SLM 8, wobbling device 10, and display optics 12). More specifically, since image data 14 for the image frame is received and stored by image frame buffer 32, image data 14 may be received at any input rate. As such, the frame rate of the image frame may be converted to the timing requirement of the remaining components in display system 2. For example, image data 14 may be received by image processing unit 4 at a rate of 30 frames per second while SLM 8 may be configured to operate at 60 frames per second. In this case, frame rate conversion unit 26 converts the frame rate from 30 frames per second to 60 frames per second.

Resolution adjustment unit 28 receives image data 14 for an image frame and adjusts a resolution of image data 14. More specifically, image processing unit 4 receives image data 14 for the image frame at an original resolution and processes image data 14 to match the resolution that display system 2 is configured to display. Image processing unit 4 increases, decreases, or leaves unaltered the resolution of image data 14 to match the resolution that display system 2 is configured to display.

In one embodiment, sub-frame generation unit 30 receives and processes image data 14 for an image frame and defines a number of image sub-frames corresponding to the image frame. If the resolution adjustment unit 28 has adjusted the resolution of image data 14, the sub-frame generation unit 30 receives image data 14 at the adjusted resolution. Each of the image sub-frames comprises a data array or matrix that represents a subset of image data 14 corresponding to the image that is to be displayed. The data arrays comprise pixel data defining the content of pixels in a pixel area equal to the pixel area of the corresponding image frame. Because, each image sub-frame is displayed in spatially different image sub-frame locations, each of the image sub-frames' data arrays comprise slightly different pixel data. In one embodiment, image processing unit 4 may only generate image sub-frames corresponding to an image that is to be displayed as opposed to generating both an image frame and corresponding image sub-frames.

As mentioned, each image sub-frame in a group of image sub-frames corresponding to an image frame comprises a matrix or array of pixel data corresponding to an image to be displayed. In one embodiment, each image sub-frame is input to SLM 8. SLM 8 modulates a light beam in accordance with the sub-frames and generates a light beam bearing the sub-frames. The light beam bearing the individual image sub-frames is eventually displayed by display optics 12 to create a displayed image. However, after light corresponding to each image sub-frame in a group of sub-frames is modulated by SLM 8 and before each image sub-frame is displayed by display optics 12, wobbling device 10 shifts the position of the light path between SLM 8 and display optics 12. In other words, the wobbling device shifts the pixels such that each image sub-frame is displayed by display optics 12 in a slightly different spatial position than the previously displayed image sub-frame. Thus, because the image sub-frames corresponding to a given image are spatially offset from one another, each image sub-frame includes different pixels or portions of pixels. Wobbling device 10 may shift the pixels such that the image sub-frames are offset from each other by a vertical distance, a horizontal distance, or both a vertical distance and a horizontal distance.

In one embodiment, each of the image sub-frames in a group of sub-frames corresponding to an image is displayed by display optics 12 at a high rate such that the human eye cannot detect the rapid succession between the image sub-frames. The rapid succession of the image sub-frames appears as a single displayed image. By sequentially displaying the image sub-frames in spatially different positions, the apparent resolution of the finally displayed image is enhanced.

FIGS. 9–12 illustrate an exemplary spatial displacement of image sub-frames by an exemplary wobbling device. Sequential color is combined with the spatial displacement of the image sub-frames to produce a displayed color image.

Figure 9A:
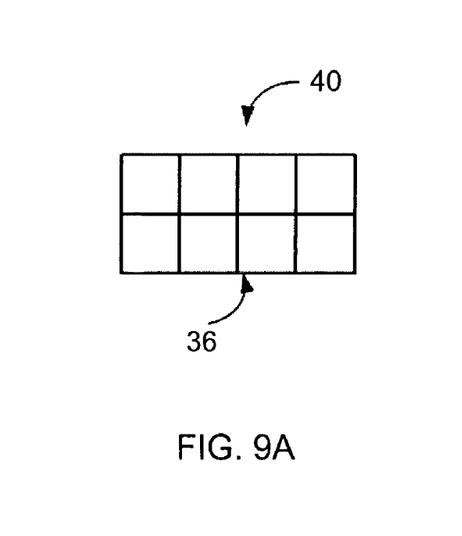
FIGS. 9A–C illustrate that a number of image sub-frames may be generated for a particular image according to one exemplary embodiment.
Figure 9B:
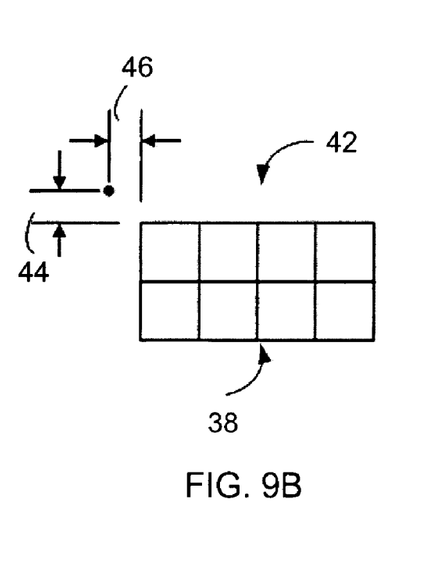
Figure 9C:
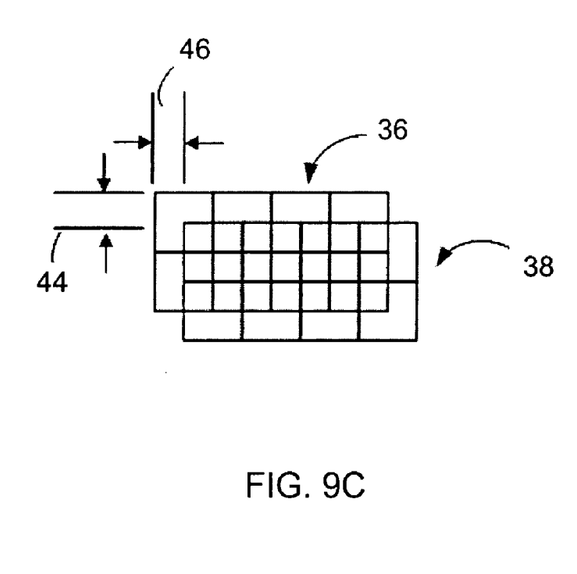

FIGS. 9A–C illustrate an exemplary embodiment wherein a number of image sub-frames are generated for a particular image. As illustrated in FIGS. 9A–C, the exemplary image processing unit 4 generates two image sub-frames for a particular image. More specifically, image processing unit 4 generates first sub-frame 36 and second sub-frame 38 for the image frame. Although the image sub-frames in this example and in subsequent examples are generated by image processing unit 4, it will be understood that the image sub-frames may be generated by sub-frame generation unit 30 or by a different component of display system 2. First sub-frame 36 and second sub-frame 38 each comprise a data array of a subset of image data 14 for the corresponding image frame. Although the exemplary image processing unit 4 generates two image sub-frames in the example of FIGS. 9A–C, it will be understood that two image sub-frames are an exemplary number of image sub-frames that may be generated by image processing unit 4 and that any number of image sub-frames may be generated in other embodiments.

As illustrated in FIG. 9B, first sub-frame 36 is displayed in first image sub-frame location 40. Second sub-frame 38 is displayed in second image sub-frame location 42 that is offset from first sub-frame location 40 by vertical distance 44 and horizontal distance 46. As such, second sub-frame 38 is spatially offset from first sub-frame 36 by a predetermined distance. In one illustrative embodiment, as shown in FIG. 9C, vertical distance 44 and horizontal distance 46 are each approximately one-half of one pixel. However, the spatial offset distance between first image sub-frame location 40 and second image sub-frame location 42 may vary as best serves a particular application. In an alternative embodiment, first sub-frame 36 and second sub-frame 38 may only be offset in either the vertical direction or in the horizontal direction in an alternative embodiment. In one embodiment, wobbling device 10 is configured to offset the beam of light between SLM 8 and display optics 12 such that first 36 and second 38 sub-frames are spatially offset from each other.

As illustrated in FIG. 9C, display system 2 alternates between displaying first sub-frame 36 in first image sub-frame location 40 and displaying second sub-frame 38 in second image sub-frame location 42 that is spatially offset from first image sub-frame location 40. More specifically, wobbling device 10 shifts the display of second sub-frame 38 relative to the display of first sub-frame 36 by vertical distance 44 and by horizontal distance 46. As such, the pixels of first sub-frame 36 overlap the pixels of second sub-frame 38. In one embodiment, the display system 2 completes one cycle of displaying first sub-frame 36 in first image sub-frame location 40 and displaying second sub-frame 38 in second image sub-frame location 42 resulting in a displayed image with an enhanced apparent resolution. Thus, second sub-frame 38 is spatially and temporally displaced relative to first sub-frame 36. However, the two sub-frames are seen together by an observer as an enhanced single image.

Figure 10A:
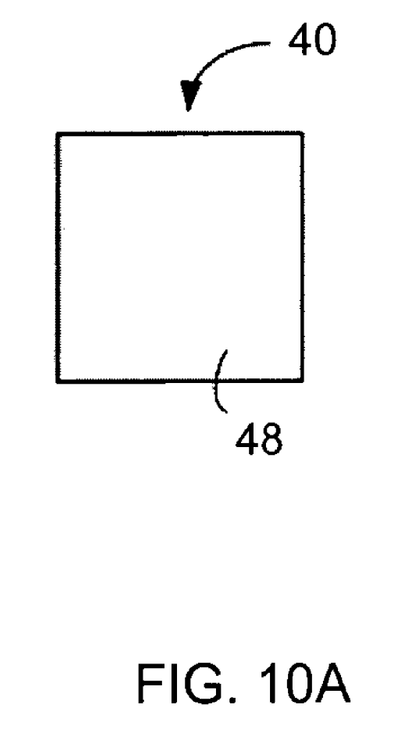
FIGS. 10A–B illustrate displaying a pixel from the first sub-frame in a first image sub-frame location and displaying a pixel from the second sub-frame in the second image sub-frame location according to one exemplary embodiment.
Figure 10B:
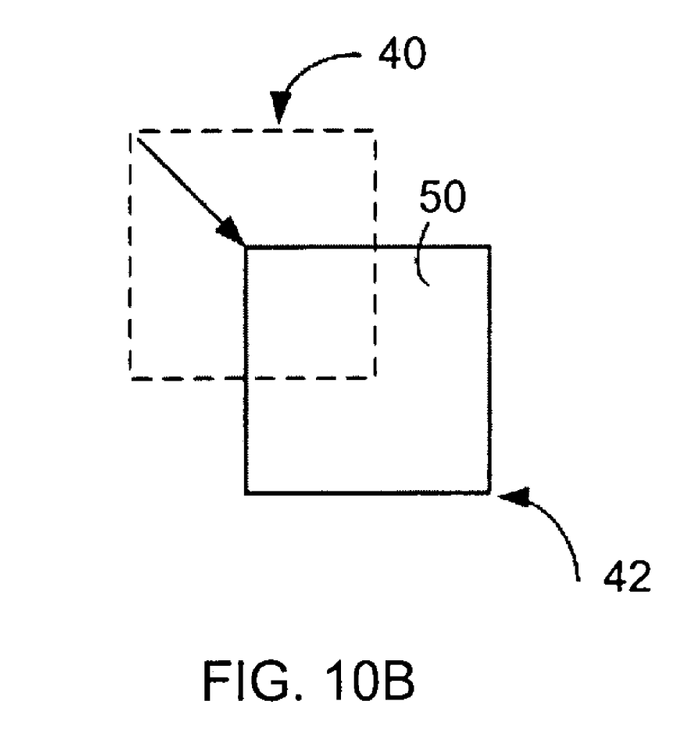

FIGS. 10A–B illustrate an exemplary embodiment of completing one cycle of displaying pixel 48 from first sub-frame 36 in first image sub-frame location 40 and displaying pixel 50 from second sub-frame 38 in second image sub-frame location 42. FIG. 10A illustrates the display of pixel 48 from first sub-frame 36 in first image sub-frame location 40. FIG. 10B illustrates the display of pixel 50 from second sub-frame 38 in second image sub-frame location 42. In FIG. 10B, first image sub-frame location 40 is illustrated by dashed lines.

By generating a first 36 and second 38 sub-frame and displaying the two sub-frames 36, 38 in the spatially offset manner as illustrated in FIGS. 9A–C and FIGS. 10A–B, twice the amount of pixel data is used to create the finally displayed image as compared to the amount of pixel data used to create a finally displayed image without using the image sub-frames. Accordingly, with two-position processing, the resolution of the finally displayed image is increased by a factor of approximately 1.4 or the square root of two.

In another embodiment, as illustrated in FIGS. 11A–D, image processing unit 4 defines four image sub-frames for an image frame. More specifically, image processing unit 4 defines first sub-frame 36, second sub-frame 38, third sub-frame 52, and fourth sub-frame 54 for the image frame. As such, first sub-frame 36, second sub-frame 38, third sub-frame 52, and fourth sub-frame 54 each comprise a data array of a subset of image data 14 for the corresponding image frame.

Figure 11A:
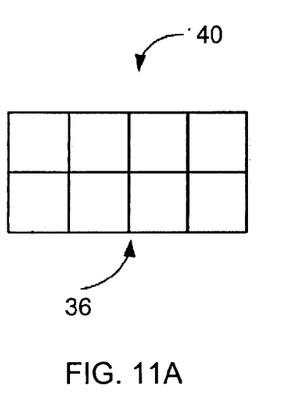
FIGS. 11A–D illustrate that the sub-frame generation function may define four image sub-frames for an image frame according to one exemplary embodiment.
Figure 11B:
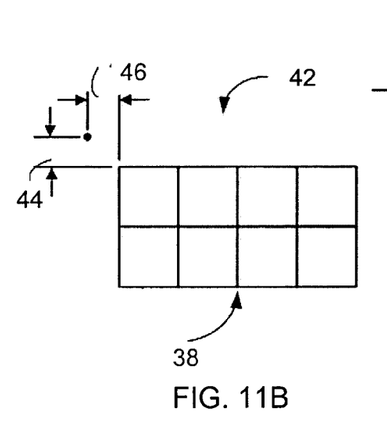
Figure 11C:
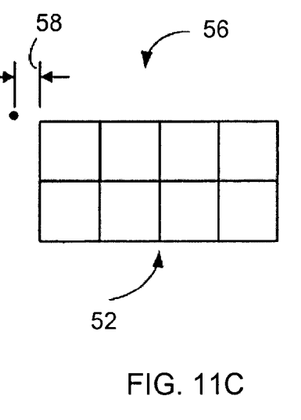
Figure 11D:
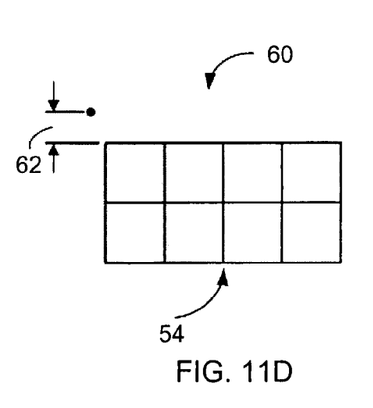

In one embodiment, as illustrated in FIGS. 11B–D, first sub-frame 36 is displayed in first image sub-frame location 40. Second image sub-frame 38 is displayed in second image sub-frame location 42 that is offset from first sub-frame location 40 by vertical distance 44 and horizontal distance 46. Third sub-frame 52 is displayed in third image sub-frame location 56 that is offset from first sub-frame location 40 by horizontal distance 58. Horizontal distance 58 may be, for example, the same distance as horizontal distance 46. Fourth sub-frame 54 is displayed in fourth image sub-frame location 60 that is offset from first sub-frame location 40 by vertical distance 62. Vertical distance 62 may be, for example, the same distance as vertical distance 44. As such, second sub-frame 38, third sub-frame 52, and fourth sub-frame 54 are each spatially offset from each other and spatially offset from first sub-frame 36 by a predetermined distance. In one illustrative embodiment, vertical distance 44, horizontal distance 46, horizontal distance 58, and vertical distance 62 are each approximately one-half of one pixel. However, the spatial offset distance between the four sub-frames may vary as best serves a particular application. In one embodiment, wobbling device 10 is configured to offset the beam of light between SLM 8 and display optics 12 such that the first 36, second 38, third 52, and fourth 54 sub-frames are spatially offset from each other.

In one embodiment, display system 2 completes one cycle of displaying first sub-frame 36 in first image sub-frame location 40, displaying second sub-frame 38 in second image sub-frame location 42, displaying third sub-frame 52 in third image sub-frame location 56, and displaying fourth sub-frame 54 in fourth image sub-frame location 60 resulting in a displayed image with an enhanced apparent resolution. Thus second sub-frame 38, third sub-frame 52, and fourth sub-frame 54 are spatially and temporally displaced relative to each other and relative to first sub-frame 36.

Figure 12A:
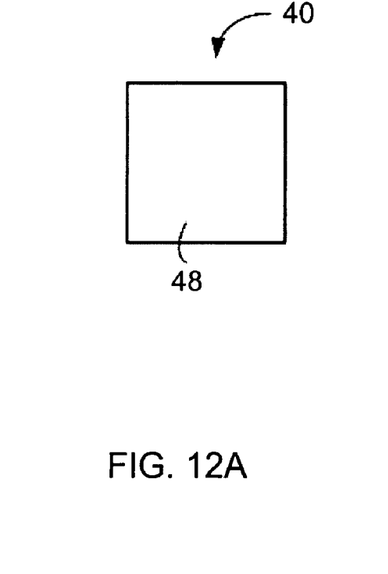
FIGS. 12A–D illustrate displaying a pixel from the first sub-frame in a first image sub-frame location, displaying a pixel from the second sub-frame in a second image sub-frame location, displaying a pixel from the third sub-frame in a third image sub-frame location, and displaying a pixel from the fourth sub-frame in a fourth image sub-frame location according to one exemplary embodiment.
Figure 12B:
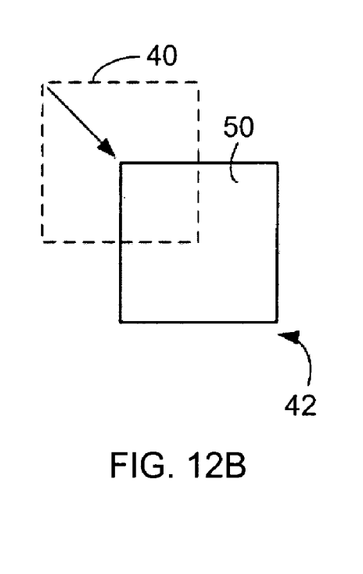
Figures 12C, 12D:
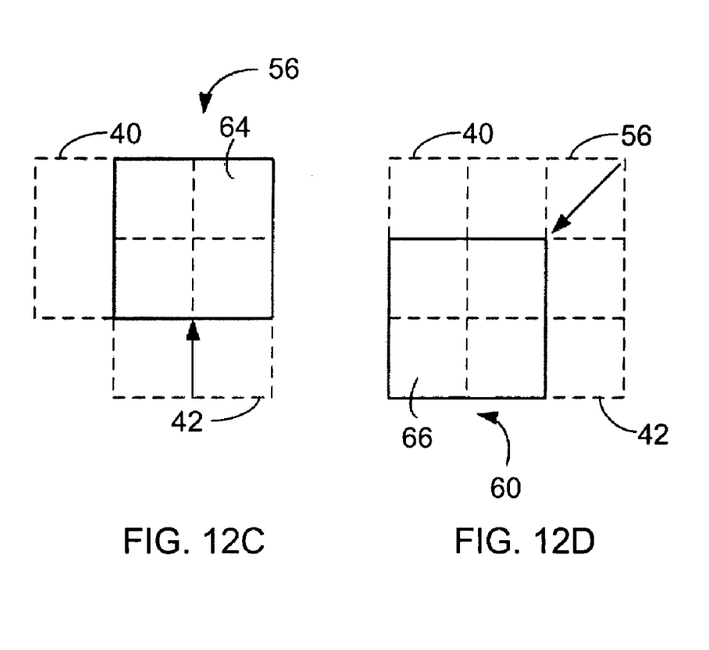

FIGS. 12A–D illustrate an exemplary embodiment of completing one cycle of displaying pixel 48 from first sub-frame 36 in first image sub-frame location 40, displaying pixel 50 from second sub-frame 38 in second image sub-frame location 42, displaying pixel 64 from third sub-frame 52 in third image sub-frame location 56, and displaying pixel 66 from the fourth sub-frame 54 in fourth image sub-frame location 60. FIG. 12A illustrates the display of pixel 48 from first sub-frame 36 in first image sub-frame location 40. FIG. 12B illustrates the display of pixel 50 from second sub-frame 38 in second image sub-frame location 42 where first image sub-frame location 40 is illustrated by dashed lines. FIG. 12C illustrates the display of pixel 64 from third sub-frame 52 in third image sub-frame location 56 where first 40 and second 42 image sub-frame location are illustrated by dashed lines. Finally, FIG. 12D illustrates thee display of pixel 66 from the fourth sub-frame 54 in fourth image sub-frame location 60 where first 40, second 42, and third 56 image sub-frame location are illustrated by dashed lines.

By generating four image sub-frames and displaying the four sub-frames in the spatially offset manner as illustrated in FIGS. 11A–D and FIGS. 12A–D, four times the amount of pixel data is used to create the finally displayed image as compared to the amount of pixel data used to create a finally displayed image without using the image sub-frames. Accordingly, with four-position processing, the resolution of the finally displayed image is increased by a factor of two or the square root of four.

As shown by the examples in FIGS. 9–12, by generating a number of image sub-frames for an image frame and spatially and temporally displaying the image sub-frames relative to each other, display system 2 can produce a displayed image with a resolution greater than that which SLM 8 is configured to display. In one illustrative embodiment, for example, with image data 14 having a resolution of 800 pixels by 600 pixels and SLM 8 having a resolution of 800 pixels by 600 pixels, four-position processing by display system 2 with resolution adjustment of image data 14 produces a displayed image with a resolution of 1600 pixels by 1200 pixels.

In addition, by overlapping pixels of image sub-frames, display system 2 may reduce the undesirable visual effects caused by a defective pixel. For example, if four sub-frames are generated by image processing unit 4 and displayed in offset positions relative to each other, the four sub-frames effectively diffuse the undesirable effect of the defective pixel because a different portion of the image that is to be displayed is associated with the defective pixel in each sub-frame. A defective pixel is defined to include an aberrant or inoperative display pixel such as a pixel which exhibits only an "on" or "off" position, a pixel which produces less intensity or more intensity than intended, or a pixel with inconsistent or random operation.

Figure 13:
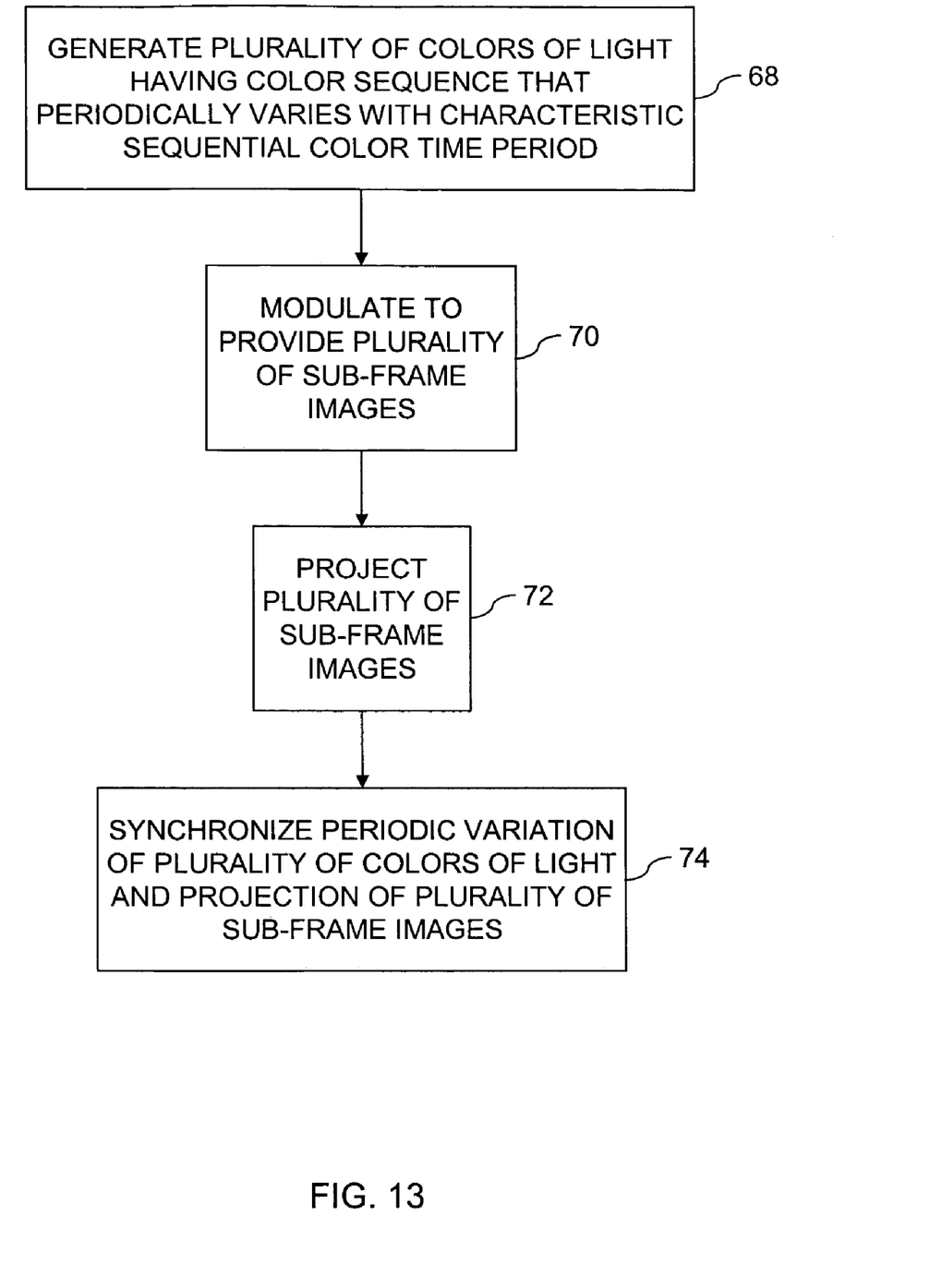
FIG. 13 is a flow chart illustrating one embodiment of the present invention method for creating color sub-frame images.

FIG. 13 is a flow chart representing steps of one embodiment of the present invention. Although the steps represented in FIG. 13 are presented in a specific order, the present invention encompasses variations in the order of steps. Furthermore, additional steps may be executed between the steps illustrated in FIG. 13 without departing from the scope of the present invention.

A plurality of colors of light is generated 68. The plurality of colors of light have a color sequence that periodically varies with a characteristic sequential color time period. In one embodiment, the plurality of colors of light is generated 68 by passing a beam of light through a rotating color filter wheel. In one embodiment, the filter wheel rotates with a period that is an integer multiple of the color time period.

The plurality of colors of light are modulated 70 to provide a plurality of sub-frame images for each of the image frames. The plurality of sub-frame images for each of the image frames during frame period T is projected 72. For each image frame, each of the sub-frame images is projected 72 displaced relative to each other sub-frame image.

The periodic variation of the plurality of colors of light and the projection of the plurality of sub-frame images are synchronized 74 to assure an integer relationship between the color time period and frame period T. In one embodiment, the color time period is equal to frame period T. In an alternate embodiment, the color time period is equal to the inverse of an integer multiple of frame period T. In another embodiment, the color time period is equal to an integer multiple of frame period T.

In one embodiment, synchronizing 74 the periodic variation of the plurality of colors of light and projection of the plurality of sub-frame images comprises discovering the color time period and synchronizing frame period T to an integer relationship with the color time period. In one embodiment, discovering the color time period includes tracking a sequential color device. In an alternate embodiment, discovering the color time period includes monitoring a frequency set point of a sequential color device.

Figure 14:
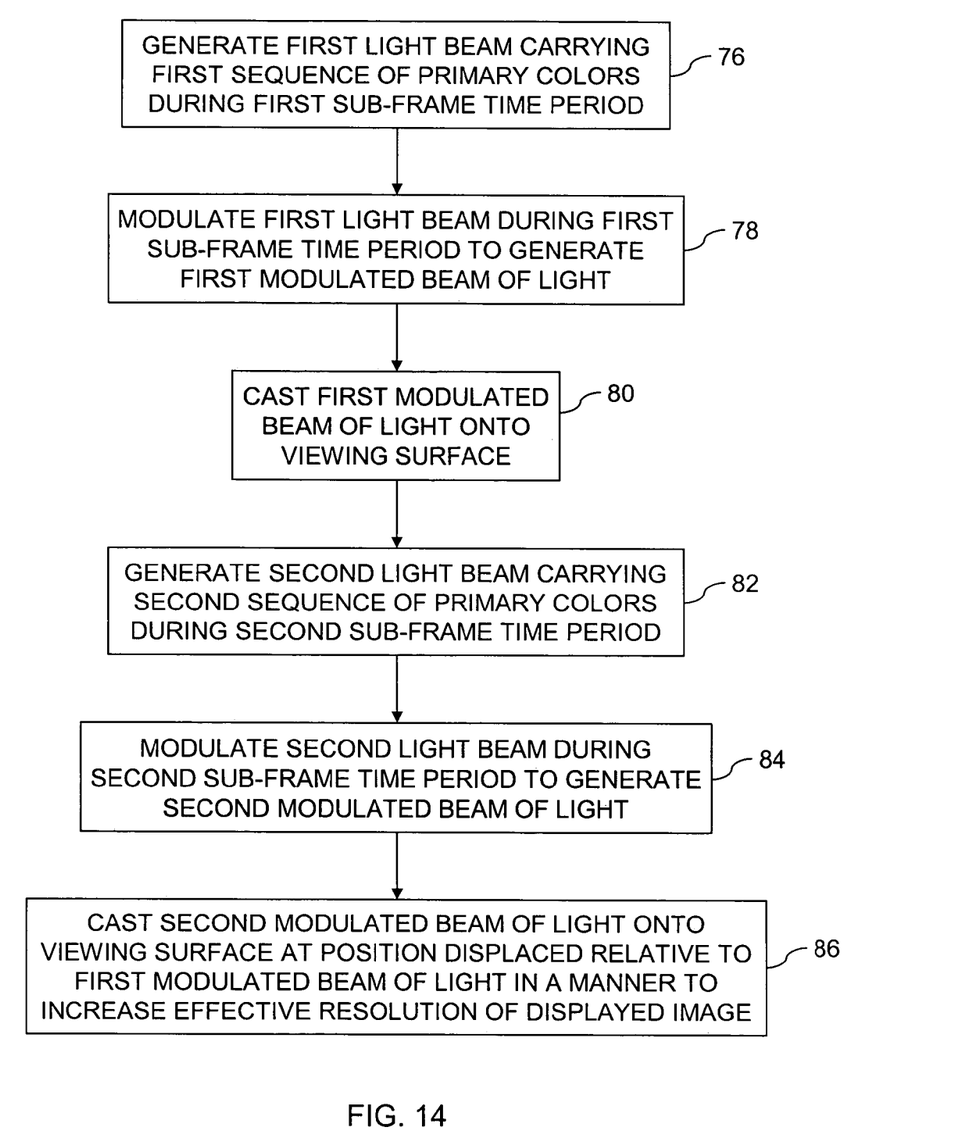
FIG. 14 is a flow chart illustrating another embodiment of the present invention method for creating color sub-frame images.

FIG. 14 is a flow chart representing steps of another embodiment of the present invention. Although the steps represented in FIG. 14 are presented in a specific order, the present invention encompasses variations in the order of steps. Furthermore, additional steps may be executed between the steps illustrated in FIG. 14 without departing from the scope of the present invention.

A first light beam is generated 76. The first light beam carries a first sequence of primary colors during a first sub-frame time period. The first light beam is modulated 78 during the first sub-frame time period to generate a first modulated beam of light. The first modulated beam of light is cast 80 onto a viewing surface.

A second light beam is generated 82. The second light beam carries a second sequence of primary colors during a second sub-frame time period. The second light beam is modulated 84 during the second sub-frame time period to generate a second modulated beam of light.

The second modulated beam of light is cast 86 onto the viewing surface at a position displaced relative to the first modulated beam of light in a manner to increase the effective resolution of the displayed image.

In one embodiment, the first and second light beams carrying the first and second sequences of primary colors are generated 76, 82 using at least one color wheel. Alternatively, the first and second light beams carrying the first and second sequences of primary colors are generated 76, 82 using any other device for generating a sequence of colors.

In one embodiment, the first and second sequences of primary colors are complete sequences of primary colors. In an alternative embodiment, each of the first and second sequences of primary colors includes two or more of red, green, blue, cyan, yellow, magenta, and white.

The foregoing description is only illustrative of the invention. Various alternatives, modifications, and variances can be devised by those skilled in the art without departing from the invention. Accordingly, the present invention embraces all such alternatives, modifications, and variances that fall within the scope of the appended claims.

What is claimed is:

1. A method for creating a sequence of image frames, the method comprising:
   generating a plurality of colors of light having a color sequence with a varying color time period with respect to a characteristic sequential color time period;
   modulating the plurality of colors of light sequentially to provide a plurality of sequential sub-frame images for each of the image frames;
   projecting the plurality of sub-frame images during a projected frame period for each of the image frames during the varying color time period;
   for each image frame, each of the sub-frame images projected displaced relative to sub-frame images of a prior image frame by less than 1 pixel; and
   synchronizing the projection of the plurality of sub-frame images to the varying color time period to assure an integer relationship between the varying color time period and the projected frame period.

2. The method of claim 1 wherein generating the plurality of colors of light comprises passing a beam of light through a rotating color filter wheel.

3. The method of claim 2 wherein the filter wheel rotates with a period that is an integer multiple of the varying color time period.

4. The method of claim 1 wherein synchronizing the periodic variation of the plurality of colors of light and projection of the plurality of sub-frame images comprises:
   discovering the varying color time period and
   synchronizing the projected frame period to an integer relationship with the varing color time period.

5. The method of claim 4 wherein discovering the varing color time period includes tracking a sequential color device.

6. The method of claim 4 wherein discovering the varying color time period includes monitoring a color time period set point of a sequential color device.

7. The method of claim 1 wherein the integer relationship between the varying color time period and the projected frame period includes the varying color time period equal to the projected frame period.

8. The method of claim 1 wherein the integer relationship between the varying color time period and the projected frame period includes the varying color time period equal to the inverse of an integer multiple of is the projected frame period.

9. The method of claim 1 wherein the integer relationship between the varying color time period and the projected frame period includes the varying color time period equal to an integer multiple of the projected frame period.

10. A display system for creating a sequence of image frames, the display system comprising:
    a spatial light modulator configured to modulate light to provide a plurality of sub-frame images for each of the image frames during a projected frame period;
    a periodic light generator configured to generate a plurality of colors of light for each of the plurality of sub-frame images having a color sequence with a varying color time period with respect to a characteristic sequential color time period, the periodic light generator disposed to pass the plurality of colors of light across the spatial light modulator;
    a periodic wobbling device configured to provide a relative displacement of the sub-frame images by less than one pixel for each varying color time period for each image frame; and
    a system timing unit configured to synchronize the projected frame period to the periodic light generator and the periodic wobbling device to assure an integer relationship between the varying color time period and the projected frame period.

11. The display system of claim 10 wherein the periodic light generator comprises:
    a sequential color device and
    a light source color modulated by the sequential color device.

12. The display system of claim 11 wherein the sequential color device comprises a rotating color filter wheel, the rotating color filter wheel having a time period of rotation that is an integer multiple of the varying color time period.

13. The display system of claim 12 wherein the integer multiple is one and the rotating color filter wheel has a single set of primary color filter elements.

14. The display system of claim 12 wherein the integer is greater than one and the rotating color filter wheel has a quantity of sets of primary color filter elements equal to the integer.

15. The display system of claim 10 wherein the varing color time period equals the projected frame period.

16. The display system of claim 10 wherein the varing color time period equals the inverse of an integer multiple of the projected frame period.

17. The display system of claim 10 wherein the varying color time period equals an integer multiple of the projected frame period.

18. A display system for creating a sequence of image frames, the display system comprising:
    means for modulating light to provide a plurality of sub-frame images for each of the image frames during a projected frame period;
    means for generating a plurality of colors of light having a sequential color sequence for each of the plurality of sub-frame images having a varying color time period with respect to a characteristic sequential color time period and passing the plurality of colors of light to the means for modulating light;
    means for displacing the sub-frame images of each image frame relative to each other sub-frame image of the same image frame by less than one pixel; and
    means for synchronizing the means for displacing to the means for generating to assure an integer relationship between the varying color time period and the projected frame period.

19. The display system of claim 18 wherein the means for generating a plurality of colors of light comprises:
    a sequential color device and
    a light source color modulated by the sequential color device.

20. The display system of claim 19 wherein the sequential color device comprises a rotating color filter wheel, the rotating color filter wheel having a time period of rotation that is an integer multiple of the varying color time period.

21. The display system of claim 19 wherein the integer multiple is one and the rotating color filter wheel has a single set of primary color filter elements.

22. The display system of claim 19 wherein the integer multiple is greater than one and the rotating color filter wheel has a quantity of sets of primary color filter elements equal to the integer.

23. The display system of claim 18 wherein the varying color time period equals the projected frame period.

24. The display system of claim 18 wherein the varying color time period equals the inverse of an integer multiple of the projected frame period.

25. The display system of claim 18 wherein the varying color time period equals an integer multiple of the projected frame period.

26. A display system comprising:
   an image processing unit configured to generate at least two data arrays during a projected frame period, each data array defining a sub-frame image to be displayed during an image sub-frame time period;
   a periodic color light generator having a varying color light period and configured to generate a sequence of primary colors during each of at least two of the image sub-frame time periods;
   a light modulator configured to receive light from the periodic light generator and to generate a modulated light beam during each image sub-frame time period;
   a wobbling device configured to receive the modulated light beam and provide relative displacement between the sub-frame images during the projected frame; and
   a system timing unit configured to synchronize the wobbling device to the varying color light period to allow the projected frame period to be an integer multiple of the varying color light period.

27. The system of claim 26 wherein the light modulator is further configured to modulate the light beam based upon each of the image sub-frame data arrays.

28. The system of claim 26 wherein the periodic light generator includes a color filter wheel.

29. An image processing unit configured to generate a frame image on a viewing surface during a projected frame period, the image processing unit comprising:
   a) a frame generation unit configured to send control signals to a spatial light modulator during the projected frame period, the projected frame period having at least a first sub-frame time period and a second sub-frame time period to define:
      a first sub-frame image on the viewing surface during the first sub-frame time period, and
      a second sub-frame image on the viewing surface during the second sub-frame time period; and
   b) a system timing unit configured to:
      monitor the position of a color wheel having a varying color light period, the color wheel optically coupled to illuminate the spatial light modulator with a first sequence of colors during the first sub-frame period and with a second sequence of colors during the second sub-frame period,
      synchronize the projected frame period to the varying color light period, and
      synchronize a wobbling device to the varying color light period, the wobbling device configured to provide a relative spatial displacement between the first sub-frame image and the second sub-frame image.

30. An image processing unit, comprising:
   means to determine the position of a color wheel having a first varying color light period as the color wheel illuminates a spatial light modulator with a first sequence of colors during a first sub-frame time period and to determine the position of the color wheel having a second varying color light period as the color wheel illuminate the spatial light modulator with a second sequence of colors during a second sub-frame time period;
   means to receive image data and create a first sub-frame image and a second sub-frame image based on the position of the color wheel;
   means to send control signals to the spatial light modulator during the first sub-frame time period to define the first sub-frame image on a viewing surface and the second sub-frame time period to define the second sub-frame image on the viewing surface; and
   means to send control signals to a wobbling device to provide a relative is displacement between the first sub-frame image and the second sub-frame image.

31. The image processing unit of claim 30 further comprising means to synchronize the relative displacement with respect to the first and second varying color light periods.

* * * * *